United States Patent [19]

Grifa

[11] 4,020,796
[45] May 3, 1977

[54] PORTABLE ANIMAL BATHING APPARATUS

[76] Inventor: Mary J. Grifa, 2966 Prange Drive, Cuyahoga Falls, Ohio 44223

[22] Filed: June 5, 1975

[21] Appl. No.: 584,037

[52] U.S. Cl. .............................................. 119/158
[51] Int. Cl.² ....................................... A01K 13/00
[58] Field of Search ............. 119/158, 159, 160, 1, 119/19, 15; 4/145, 146, 152

[56] References Cited

UNITED STATES PATENTS

| 1,760,017 | 5/1930 | Smoot | 119/158 X |
|---|---|---|---|
| 2,499,174 | 2/1950 | Turner | 119/159 |
| 2,542,280 | 2/1951 | Knapp | 119/159 |
| 3,023,734 | 3/1962 | Schaub | 119/158 |
| 3,793,987 | 2/1974 | Rogers | 119/1 |
| 3,884,191 | 5/1975 | Stout | 119/158 |

Primary Examiner—G.E. McNeill
Assistant Examiner—Peter K. Skiff
Attorney, Agent, or Firm—Reese Taylor

[57] ABSTRACT

A portable animal bathing apparatus is disclosed which consists of a box-like structure having a normally open top and including bottom, end, and side walls. The structure has a removable top covering member, and a network of perforated spray pipes is received interiorly of the enclosure thus formed. An extension pipe is provided to attach the spray pipe network to a source of water supply, and furthermore a drain outlet is provided in the bottom wall. An additional feature is the provision in one of the end walls of a head-receiving opening enabling the head of the animal to be maintained exteriorly of the enclosure, and a further feature is the provision of a floor member disposed interiorly of the enclosure and elevated above the bottom wall, with the floor member having perforations therein for drainage purposes.

7 Claims, 3 Drawing Figures

PORTABLE ANIMAL BATHING APPARATUS

BACKGROUND OF THE INVENTION

This invention, in general, relates to means for bathing animals and, in particular, relates to a portable animal bathing apparatus which can be attached to any source of water supply and to any drain system and which enables the animal to be bathed quickly and efficiently with a minimum of difficulty.

DESCRIPTION OF THE PRIOR ART

The following patent prior art is known to Applicant:
Atwater et al U.S. Pat. No. 624,420
Smoot U.S. Pat. No. 1,760,017
Smoot U.S. Pat. No. 1,879,915
Kessel U.S. Pat. No. 2,536,943
O'Day U.S. Pat. No. 3,062,188
Johnson U.S. Pat. No. 3,867,906

The aforenoted patents disclose varying types of enclosures for animal baths having various specific features depending upon the animal being bathed. None of them, however, discloses the unique structure of Applicant which is extremely simple in construction yet, on the other hand, insures complete exposure for all sides of the animal.

BRIEF SUMMARY OF THE INVENTION

The difficulties encountered by the pet owner in bathing small animals, such as dogs, are believed well known. Some of the problems involved are controlling the animal during bathing and minimizing the mess caused by splashing water which usually accompanies such operations.

It has been discovered that these difficulties can be overcome by providing a box-like enclosure having a bottom wall and opposed side and end walls to form an enclosure having a normally open top. Provision has also been made for a removable top cover and a head-receiving opening for the neck and head of the animal in one of the end walls so that once the animal has been placed into the interior of the enclosure, the bathing operation can take place efficiently with a minimum amount of damage or detriment to the surrounding area since the animal is completely enclosed interiorly of the enclosure.

Also it has been discovered that interiorly of the enclosure a network of perforated spray pipes can be provided so that the water will reach all portions of the body of the animal, thereby insuring a thorough bathing job. This network of pipes can be provided with attachment means for securing the same to any conventional water source, thereby rendering the overall apparatus portable in nature.

Furthermore, it has been found that drain means adapted to be connected to an existing drain system can be provided in the bottom of the structure, and an elevated and perforated floor member can be provided resting on the bottom wall so that the excess water may drain through the floor member and out through the drain system.

Accordingly, production of an improved animal bathing apparatus of the character described becomes the principal object of this invention, with other objects thereof becoming more apparent upon a reading of the following brief specification, considered and interpreted in view of the accompanying drawings.

BRIEF DESCRIPTION OF THE PREFERRED EMBODIMENT

Figure 1:
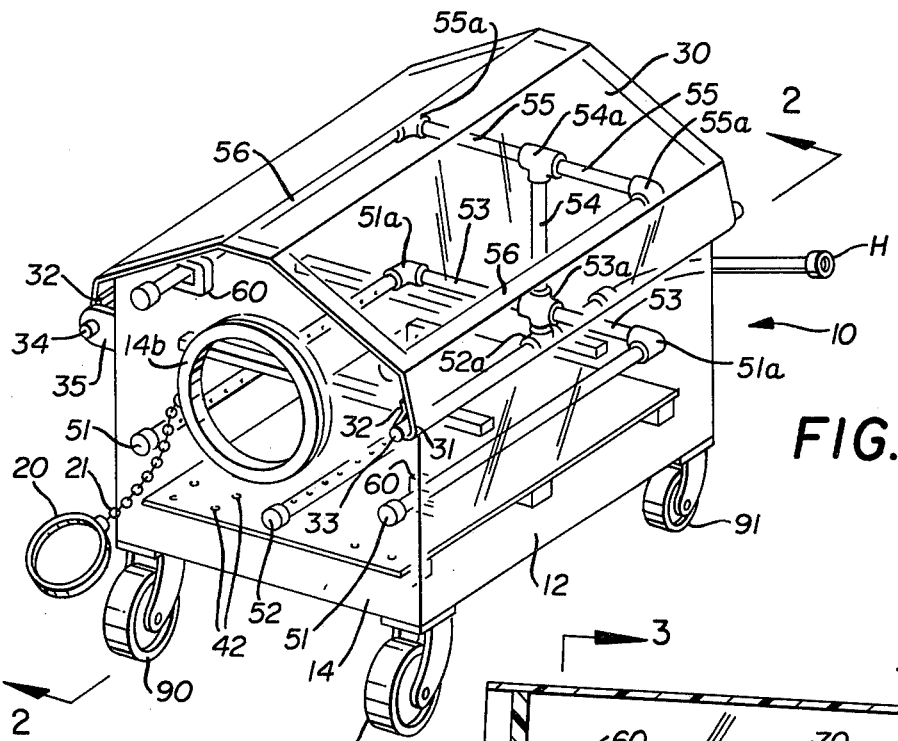
FIG. 1 is a perspective view showing the improved animal bathing apparatus.

Referring to FIG. 1, it will be noted that the improved animal bathing apparatus, generally indicated by the numeral 10, includes a bottom wall 11, opposed end walls 14 and 15, and opposed side walls 12 and 13, with all said walls being joined together to form a unitary enclosure having a normally open top.

It should be noted here that while no particular material is specified, and the invention is not intended to be necessarily limited to any particular material, the drawings illustrate the framework of the box-like enclosure including the bottom, end, and side walls as being made of a relatively clear, translucent material such as plastic which has advantages in that it enables the person bathing the animal to observe the animal during the bathing operation.

Referring to FIGS. 1 and 2 again, it will be noted that one of the end walls 14 has a through opening 14a therein, and a cushioning collar 14b preferably made of some soft resilient material is provided, with this opening being intended to be a head and neck receiving opening for the animal so that there is no danger of the soap or water being used in the bathing operation getting into the eyes or ears of the animal during the bathing operation. The cushioning collar 14b also insures the comfort of the animal and prevents injury if the animal should move about.

Also mounted on end wall 14 adjacent the opening 14a just referred to is a restraining means 20 secured by a chain or similar securing member 21 so that the restraining member 20, which would be in the nature of a conventional dog collar for instance, could be secured to the neck of the animal to prevent him from undue movement during the bathing operation.

Accordingly then, a normally open-ended rectangular box-like structure is formed. The top is capable of being closed, however, by the top member 30 which comprises a flexible covering member having a weighted rod 33 extending through an upturned end 31 on one side thereof. The other side also has an upturned end 32 which receives a rod 34 held in place by brackets 35,35 so that the top member 30 can be flipped back into uncovering relationship to the basic structure 10. The animal can then be placed inside the device, and as desired, the cover can be closed or remain open depending upon the desires of the individual user.

Received interiorly of the overall apparatus 10 is a network of pipes which, in the form of the invention illustrated, includes a first pair of opposed, spaced pipes 51,51 which are mounted in the lower portion of the enclosure adjacent the opposed side walls 12 and 13.

A second similar pair of opposed, spaced pipes 56,56 are mounted adjacent the top portion of the side walls 12 and 13.

The first pair of pipes 51,51 are secured to interconnecting pipes 53,53 by the 90 degree elbows 51a,51a, and the interconnecting pipes 53,53 are also secured, in turn, at their opposed ends to a connecting member or cross 53a which also receives still another interconnecting pipe 54 disposed vertically within the enclosure. The opposed end of the pipe 54 carries a tee 54a which provides a means for mounting auxiliary cross pipes 55,55 which are, in turn, secured to the top pair of pipes 56,56 by the 90 degree elbows 55a,55a.

Figure 2:
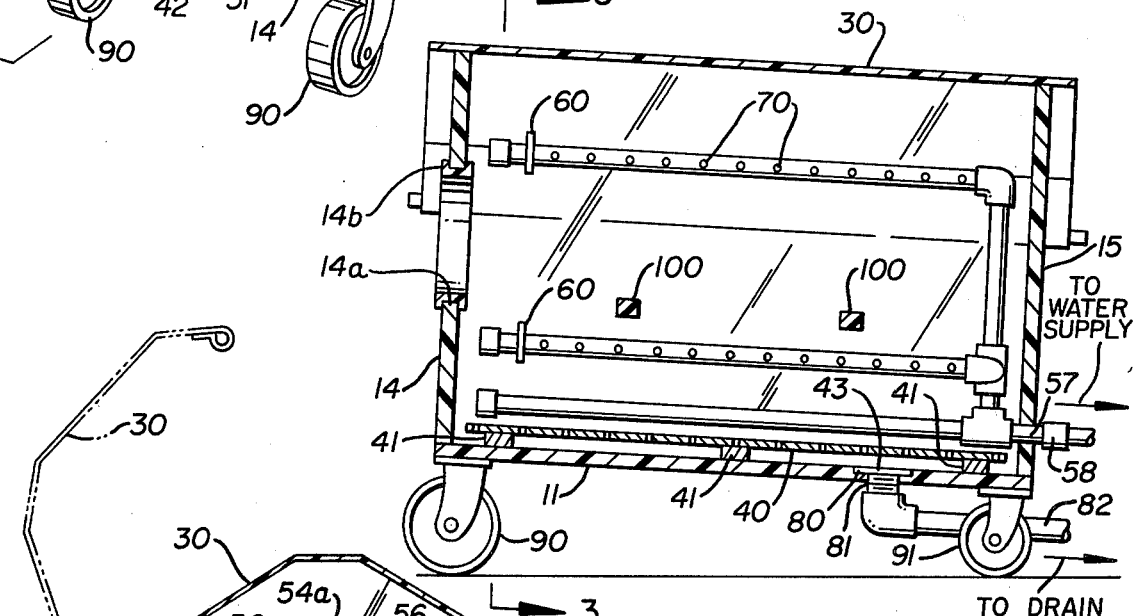
FIG. 2 is a side elevational view in section taken along the lines 2—2 of FIG. 1.
Figure 3:
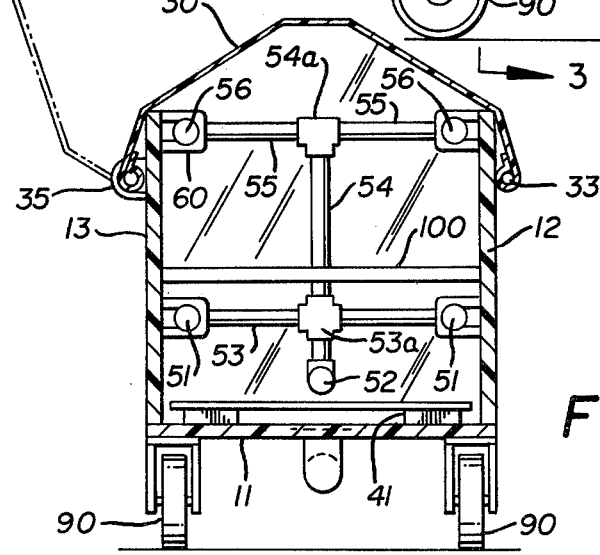
FIG. 3 is a sectional view taken along the lines 3—3 of FIG. 2.

As will be noted from FIGS. 1 through 3 of the drawings, still another spray pipe 52 is provided adjacent the bottom of the enclosure about midway between walls 12 and 13 and is secured by means of a tee connection 52a to the overall network.

Pipes 51,51, 56,56, and 52 are all perforated so that upon application of water under pressure as will be described, a spray will be directed toward the body of the animal which will be disposed between these pipes.

It should also be noted here that while the pipes could conceivably be freestanding and supported simply at their points of connection such as, for example, with regard to pipe 56 with its elbow 55a, mounting brackets 60,60 are illustrated as being secured to the interior of the side walls 12 and 13 to receive the pipes and assure that they will be held in their predetermined position.

Referring further to the piping network, it will be noted that an extension pipe 57 is secured to tee 52, protrudes through the end wall 15, and has a connector fitting 58 which is intended to be secured to any suitable hose H which will lead to the source of water supply, which can be any conventional faucet for example. Also, while the piping network is illustrated as including various connecting members such as elbows, etc., the entire network could be molded, if desired.

In addition to the piping, a floor member 40 is also disposed interiorly of the enclosure. This member is elevated above the bottom 11 of the enclosure by means of blocks 41,41. The floor member 40 has a plurality of through perforations 42,42 therein for drainage purposes, and it will be understood that the animal would stand on the floor member 40 and that when the water is sprayed onto the animal, it will drain off and through the perforations in the floor member 40.

In this regard the bottom wall 11 has a through opening 43 to which is secured a plate 80 and a thread drain extension 81. This extension can be attached again to any suitable hose, such as 82, leading to the conventional drain in the location where the apparatus is being utilized. While extension 81 is illustrated as being threaded, a press fit connection could also be used, if desired.

With regard to the drainage system, it will be noted from FIG. 2, for example, that casters 90,90 and 91,91 are attached to opposed ends of the bottom wall 11, with the casters 90,90 being larger in diameter than the casters 91,91 so that the bottom wall slopes from left to right of FIG. 2, thereby facilitating drainage.

Finally, completing the description of the internal structure, it will be noted that cross rods 100,100 are mounted interiorly of the device and extend between side walls 12 and 13. The purpose of these rods is to prevent the animal from sitting when he is inside of the device, with it being understood that the front legs of the animal would extend over the forwardmost cross bar 100, with the rear legs extending over the rearmost cross bar.

Accordingly, it will be seen that a unique, portable, animal bathing apparatus has been provided which enables the animal to be bathed thoroughly and yet safely and without any discomfort to the animal or to the person bathing the animal. Furthermore, by virtue of the easy accessibility of the top, cleaning of the enclosure following use is a relatively simple matter, and the device is essentially self-contained and adaptable to be utilized in virtually any environment in which there is a water supply source and a drain.

While a full and complete description of the invention has been set forth in accordance with the dictates of the Patent Statutes, it should be understood that modifications can be resorted to without departing from the spirit hereof or the scope of the appended claims.

Accordingly, while it was noted above that the drawings illustrate the general enclosure member as being of a clear material, any desired material could be utilized.

Furthermore, while a network which includes five spray pipes has been disclosed, it is conceivable that a greater or lesser number could be utilized as desired.

Additionally, it should be noted that while the device has been described primarily in connection with the bathing of a small animal such as a dog, no limitations on the size of the device or the species of animal for which it is intended to be used are implied herein.

What is claimed is:
1. A portable animal bathing apparatus for use with a water source, comprising;
   A. a box-like enclosure having
      1. a bottom wall,
      2. opposed end walls secured to said bottom wall, and 3. opposed side walls secured to said bottom wall and said end walls thereby forming an enclosure with a normally open top;
   B. a removable top member;
   C. a network of perforated spray pipes received interiorly of said enclosure and including
      1. a first pair of spaced pipes disposed along said side walls adjacent the bottom edges thereof
      2. a second pair of spaced pipes disposed along said side walls adjacent the top edges thereof, and
      3. at least one centrally disposed spray pipe disposed adjacent said bottom wall intermediate said first pair of spaced pipes and lying in a plane parallel to the planes of said first and second pairs of pipes; and
   D. means for connecting said network of pipes to the water source.
2. The apparatus of claim 1 further characterized by the presence of drain means releasably secured to and opening into said bottom wall.
3. The apparatus of claim 1 wherein at least one of said end walls has a head-receiving opening therein and cushioning means secured to said end wall about said opening.
4. The apparatus of claim 3 further characterized by the presence of restraining means secured to the outer surface of said end wall of said enclosure adjacent said head-receiving opening.
5. The apparatus of claim 1 further characterized by the presence of a floor member disposed in elevated condition with respect to said bottom wall and having a plurality of through openings therein.
6. A portable animal bathing apparatus for use with a water supply source and drain source comprising;
   A. a box-like enclosure having

1. a bottom wall,
2. opposed end walls secured to said bottom wall, and
3. opposed side walls secured to said bottom wall and said end walls thereby forming an enclosure with a normally open top;

B. a removable top cover adapted to enclose the top of the enclosure;

C. a network of perforated spray pipes received interiorly of said enclosure and including
1. a first pair of spaced pipes, each of which is disposed adjacent the bottom edges of one of said side walls and extend longitudinally between said end walls,
2. a second pair of spaced pipes, each of which is disposed adjacent the top edges of one of said side walls and extend longitudinally between said end walls, and
3. a centrally disposed spray pipe mounted adjacent said bottom member substantially along a line midway between said side walls and lying in a plane parallel to the planes of said first and second pairs of pipes;

D. means for connecting said network of pipes to the water supply source;

E. drain means provided in said bottom wall;

F. a floor member received interiorly of said enclosure and disposed in elevated condition with respect to said bottom wall; and G. one of said end walls having a head and neck-receiving opening therein.

7. A portable animal bathing apparatus for use with a water supply source and drain source comprising;

A. a box-like enclosure having 1. a bottom wall,
2. opposed end walls secured to said bottom wall, and
3. opposed side walls secured to said bottom wall and said end walls thereby forming an enclosure with a normally open top;

B. a removable top cover adapted to enclose the top of the enclosure;

C. a network of perforated spray pipes received interiorly of said enclosure and including
1. a first pair of spaced pipes, each of which is disposed adjacent the bottom edges of one of said side walls and extend longitudinally between said end walls,
2. a second pair of spaced pipes, each of which is disposed adjacent the top edges of one of said side walls and extend longitudinally between said end walls, and
3. a centrally disposed spray pipe mounted adjacent said bottom member substantially along a line midway between said side walls;

D. means for connecting said network of pipes to the water supply source;

E. drain means provided in said bottom wall;

F. a floor member received interiorly of said enclosure and disposed in elevated condition with respect to said bottom wall;

G. one of said end walls having a head and neck-receiving opening therein; and

H. at least one cross member extending between said side walls in spaced relationship with said end walls and lying in a plane spaced above said botton wall
1. whereby said cross member may be disposed beneath the body of the animal.

* * * * *